(12) United States Patent  (10) Patent No.: US 8,785,840 B2
Schulte  (45) Date of Patent: Jul. 22, 2014

(54) APPARATUS FOR PRODUCING EMP

(76) Inventor: David Joseph Schulte, Galesburg, MI (US)

( * ) Notice: Subject to any disclaimer, the term of this patent is extended or adjusted under 35 U.S.C. 154(b) by 0 days.

(21) Appl. No.: 10/804,978

(22) Filed: Oct. 7, 2004

(65) Prior Publication Data

US 2013/0015260 A1    Jan. 17, 2013

(51) Int. Cl.
*H01Q 13/00* (2006.01)

(52) U.S. Cl.
USPC ............... 250/251; 250/492.1; 250/493.1; 250/505.1

(58) Field of Classification Search
USPC ................ 250/492.1, 493.1, 505.1, 251
See application file for complete search history.

(56) References Cited

U.S. PATENT DOCUMENTS

| | | | | |
|---|---|---|---|---|
| 3,781,647 A | * | 12/1973 | Glaser | ............ 322/2 R |
| 4,467,328 A | | 8/1984 | Hacker | |
| 4,765,222 A | | 8/1988 | Pinson | |
| 4,817,495 A | | 4/1989 | Drobot | |
| 4,858,511 A | | 8/1989 | Jasper, Jr. | |
| 5,052,638 A | | 10/1991 | Minovitch | |
| 5,157,404 A | | 10/1992 | Rowe et al. | |
| 5,162,698 A | * | 11/1992 | Kato et al. | ........... 315/39.51 |
| 6,298,787 B1 | | 10/2001 | Warnagiris | |
| 6,333,712 B1 | | 12/2001 | Haugse et al. | |
| 6,359,582 B1 | | 3/2002 | Macaleese et al. | |
| 6,477,932 B2 | | 11/2002 | Jung | |
| 6,559,807 B2 | * | 5/2003 | Koslover | ............ 343/781 P |
| 6,754,609 B2 | | 6/2004 | Lescourret | |
| 7,051,636 B1 | | 5/2006 | Snow et al. | |
| 7,164,234 B2 | * | 1/2007 | Achenbach et al. | ....... 315/39.51 |
| 7,994,966 B1 | * | 8/2011 | Olsson et al. | ............ 342/175 |
| 2006/0038714 A1 | | 2/2006 | Osepchuk | |

OTHER PUBLICATIONS

Eastlund, Bernard J. and Jenkins, Lyle, "Thunderstorm Solar Power Satellite-Key to Space Solar Power", IEEE Sep. 19, 2002, pp. 1-5.*
Eastlund, Bernard J. and Jenkins, Lyle, "Taming Tornadoes: Storm Abatement from Space", IEEE 2001, pp. 389-394.*

* cited by examiner

*Primary Examiner* — David A Vanore
(74) *Attorney, Agent, or Firm* — The Weintraub Group, P.L.C.

(57) ABSTRACT

An apparatus which includes a plurality of sub-atmospheric vehicular devices; a substantially high power microwave transmitter located on each of the vehicular devices; and a waveguide for directing microwave energy from the high power microwave transmitter to a point in free space. The microwave energy from the microwave transmitters is directed from each of the plurality of vehicular devices to the point in free space.

14 Claims, 4 Drawing Sheets

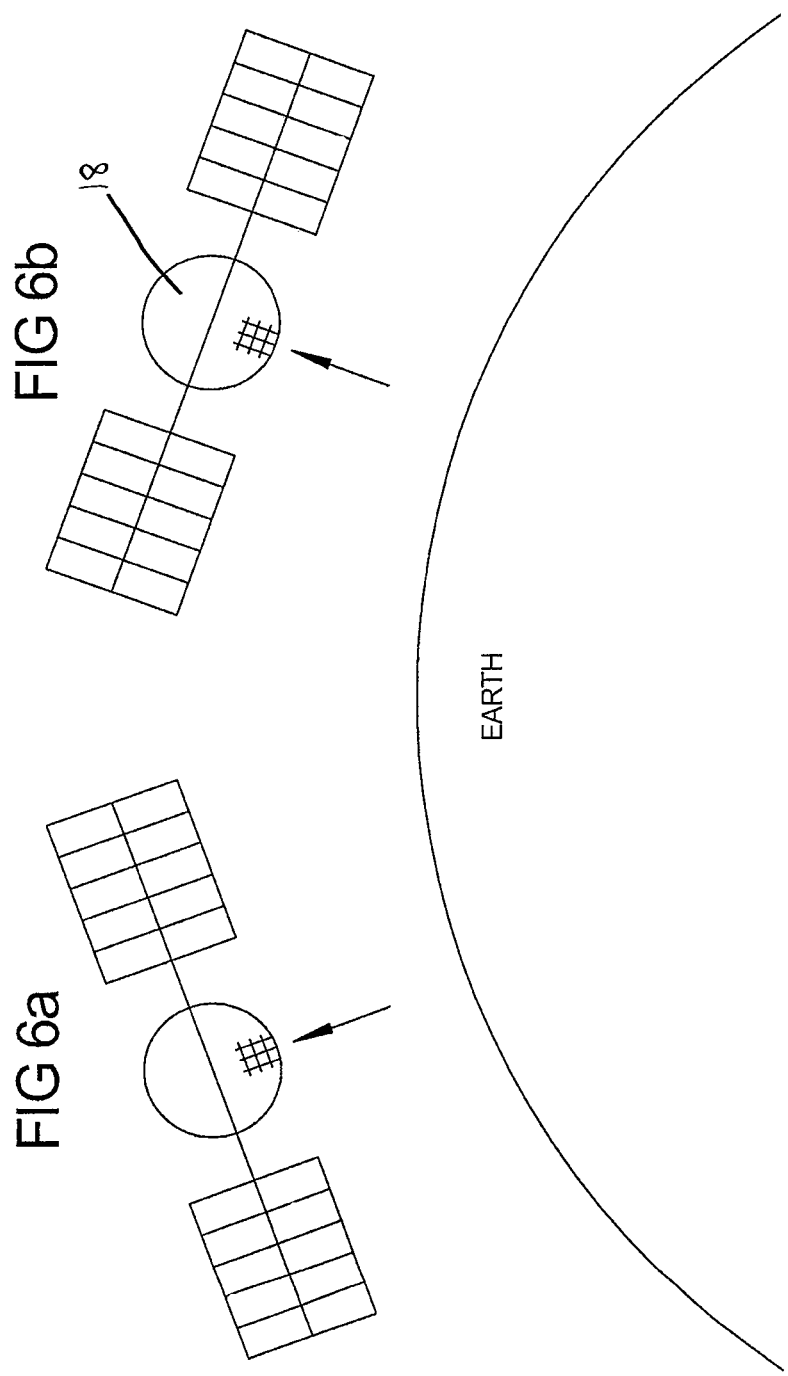

APPARATUS FOR PRODUCING EMP

BACKGROUND OF THE INVENTION

1. Field of the Invention

The present invention pertains to an EMP weapon. More particularly, the present invention pertains to an EMP weapon that projects electromagnetic waves from different origins that converge at a single point.

2. Description of the Prior Art

In today's world there exists a need for military, police, or other entities to disengage or degrade certain hostile electronic equipment, cause premature detonation, or disable hostile explosive devices at a distance. Using conventional weapons or methods to accomplish these tasks may cause unwanted casualties or damage to certain equipment. Currently, there is no weapon or system that will damage electronic systems at a distance without potentially damaging other items or injuring people.

Thus, there is a need to provide an electromagnetic weapon for degrading or destroying electronics or explosive devices that incorporates the listed benefits without the limitations inherent in present methods.

SUMMARY OF THE INVENTION

The present invention provides an apparatus which generally comprises: a plurality of sub-atmospheric vehicular devices; a substantially high power microwave transmitter located on each of the vehicular devices; a waveguide for directing microwave energy from the high power microwave transmitter to a point in free space; and wherein microwave energy is directed from each of the plurality of vehicular devices to the point in free space.

According to a second aspect hereof, there is provided an apparatus comprising: a sub-atmospheric vehicular device; at least a pair of substantially high power microwave transmitters located on the vehicular device; a waveguide being associated with each microwave transmitter for directing microwave energy from the high power microwave transmitter to a point in free space; and wherein microwave energy is directed from the vehicular device to the point in free space.

For a more complete understanding of the present invention, reference is made to the following detailed description and accompanying drawings. In the drawings, like reference characters refer to like parts throughout the views in which:

BRIEF DESCRIPTION OF THE DRAWINGS

FIGS. 6a and 6b are the electronics bays containing the synchronization electronics, satellite-to-satellite communication radios, ground-to-satellite communication radios, the Phase Locked Loop type additional synchronization circuitry, overheat detection and protection circuitry, batteries, DC power supplies and microwave RF amplifiers, laser aiming devices, and photographic lens for infrared detection and live photographic feedback through communication radios.

DETAILED DESCRIPTION OF THE PREFERRED EMBODIMENT

As referenced throughout the specification and the claims, a "vehicular device" is any suitable medium or transport for securing the microwave transmitters (e.g. magnetrons or radar devices) thereon. Examples provided below include space satellite, fighter airplanes, tanks, naval ships, and so forth. It is apparent that the space satellites operate in space, while the remaining listed vehicular devices operate sub-atmospherically.

Figure 1:
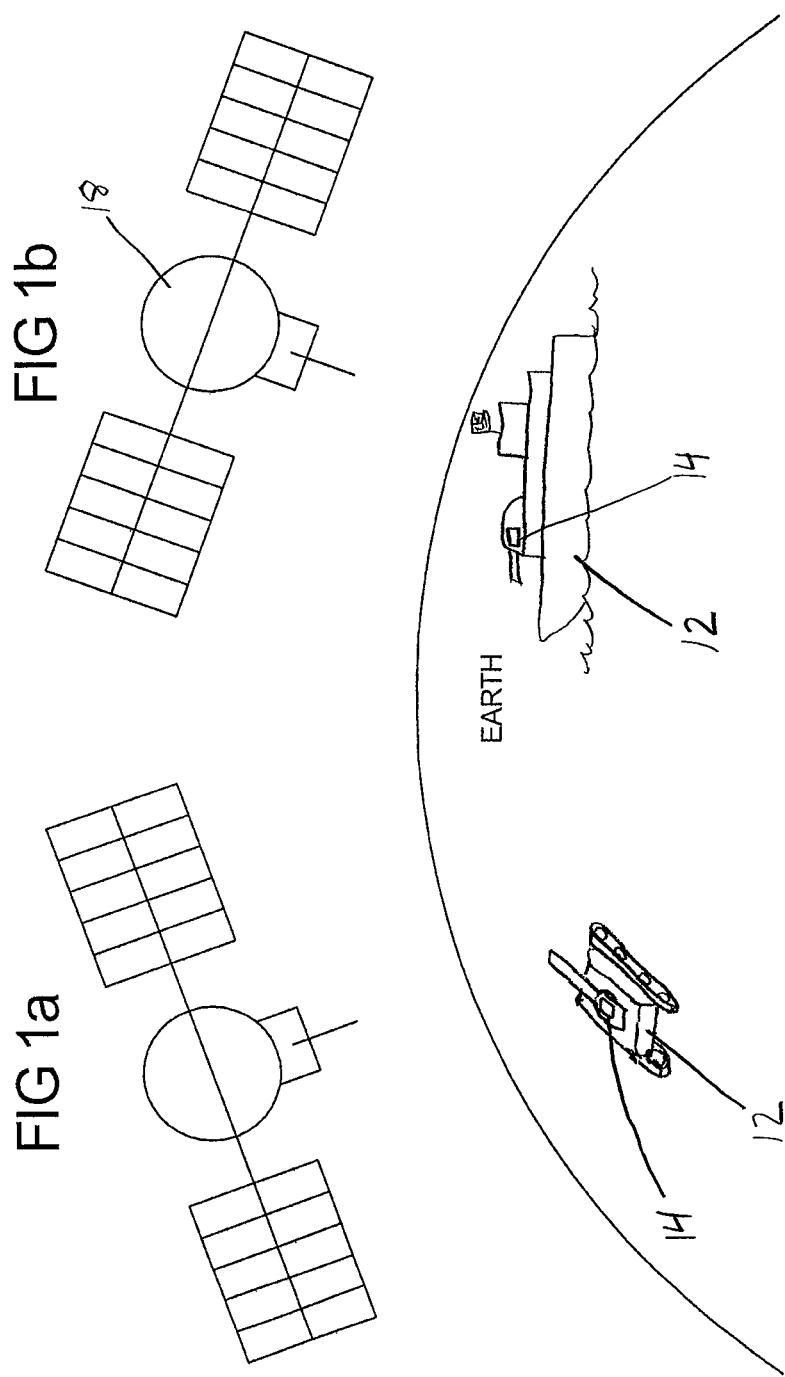
FIGS. 1a and 1b show a first embodiment of the present invention showing a pair of space satellites operating in tandem that emit synchronized radar, microwave, or other high frequency electron waves to be aimed or focused together in tandem upon a target object.

In accordance with the present invention and as shown generally in FIGS. 1a and 1b, there is provided an apparatus which generally comprises: a plurality of vehicular devices; a substantially high power microwave transmitter located on each of the vehicular devices; a waveguide for directing microwave energy from the high power microwave transmitter to a point in free space; and wherein microwave energy is directed from each of the plurality of vehicular devices to the point in free space.

According to a second aspect hereof, there is provided an apparatus comprising: a sub-atmospheric vehicular device 12; at least a pair of substantially high power microwave transmitters 14 located on the vehicular device; a waveguide 16 being associated with each microwave transmitter for directing microwave energy from the high power microwave transmitter to a point in free space; and wherein microwave energy is directed from the vehicular device to the point in free space.

Figure 2:
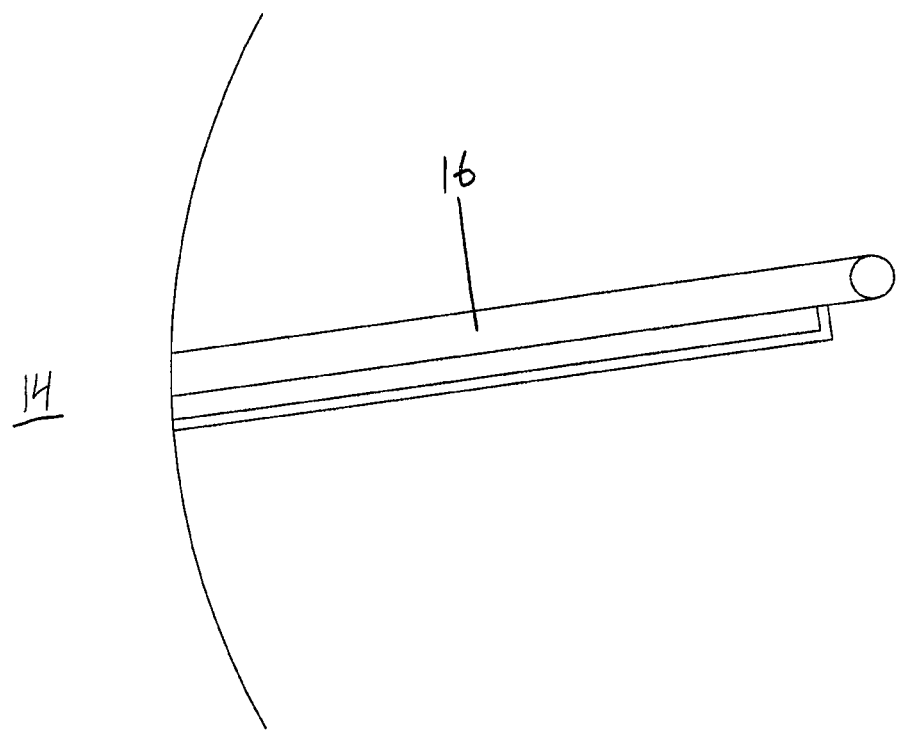
FIG. 2 is an enlarged view of the "point-sourced" waveguide employed by the present invention.

Two signature radar devices (magnetrons, or microwave transmitters) are synchronized in frequency, amplitude and phase. They can be located either far away or near each other, as long as both are synchronized and "fired" through point-sourced waveguides. The two magnetrons are of the same type, size, and output, and preferably the same exact brand. The magnetrons are synchronized in frequency, amplitude, and phase. As shown in FIG. 2, the magnetrons can be located either far away or near each other, as long as both are synchronized and "fired" through point-sourced waveguides, which resemble a rifle barrel. Each magnetron is turned on at the same time, warmed up the same amount of time, and fired at the same "Focal Point" in free-air, space, or upon a target object.

For efficiency, a "Phase Locked Loop" type circuit could be implemented to synchronize the phase and frequency of the output of each magnetron or similar high frequency emitting devices. A wavestream is created by directing the output of each magnetron/radar through a rigidly attached point-sourced waveguide, like a rifle gun barrel. The magnetrons must operate at the same amplitude, and at the same frequency, and the outputs must be emitted at the same time through identical, or similar, waveguides.

Each microwave transmitter can either be synchronized by communicating with one another, or wherein each microwave transmitter is synchronized using an external synchronization station 18.

Figure 3:
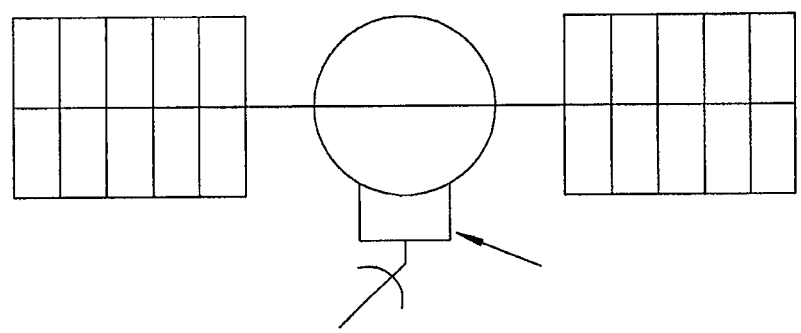
FIG. 3 shows an embodiment of the invention including a 360 degree rotating gimbal mount or similar mechanism that the magnetron and waveguide are attached to, for purposes of precisely aiming the wavestream as it emits through the attached point-sourced waveguide.
Figure 4:
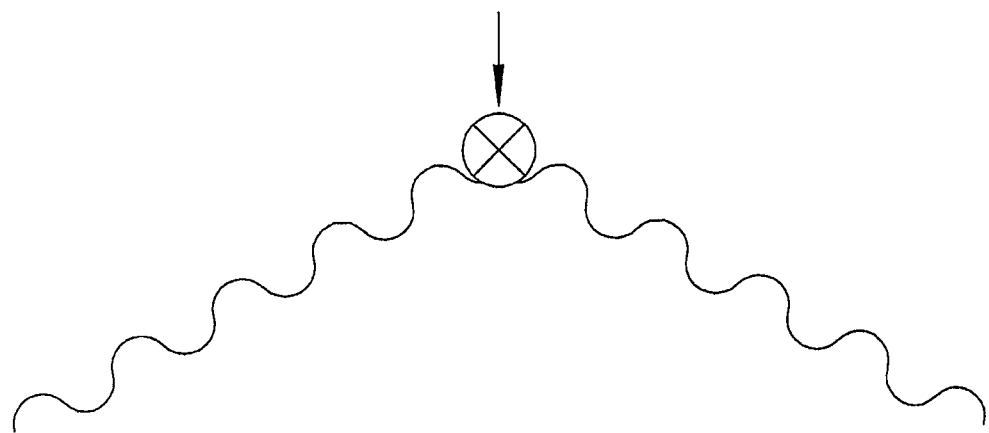
FIG. 4 shows the point of intersection of the emitted wavestreams, called the "focal point," where the two wavestreams are aimed to intersect.

Furthermore, and as shown in FIG. 3, the output is optionally aimable and confined toward the point in free space, that is, the Focal Point. There may be provided an aimable mechanism, such as a 360 degree rotating gimbal mount or similar device that the magnetron and waveguide are attached to.

The vehicular devices can be a space satellite, a tank, a naval ship or aircraft, a ground/planet-based vehicle, or other platform or device attached to or set upon the ground to facilitate aiming and firing of the system.

FIGS. 1a and 1b depict just one of the preferred embodiments: a space satellite pair, two being chosen to work in tandem, called a "Stereo Pair of Satellites", which will emit upon firing synchronized radar or microwave or other high frequency electron waves to be aimed or focused together in tandem upon the target object.

Figure 5:
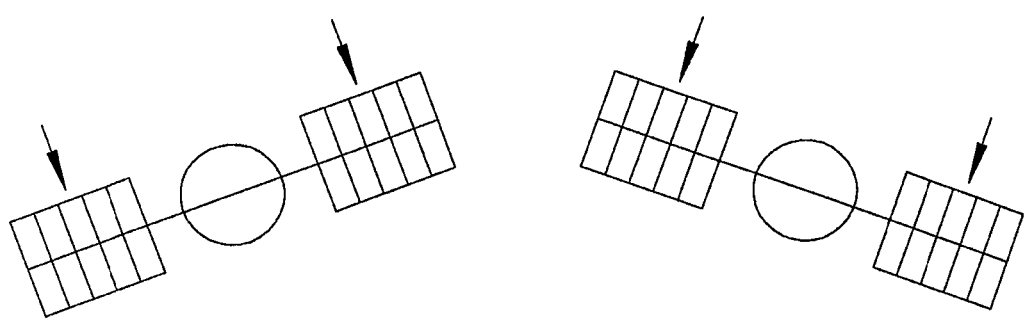
FIG. 5 shows solar panels that collect the energy necessary to operate the satellite and wavestreams by charging batteries contained in the satellites.

As shown in FIG. 5, the microwave transmitters can be powered or fueled using any suitable means that are well-known in the art, including solar panels that collect the energy necessary to operate the satellite and wavestreams by charging batteries contained in the satellites.

FIGS. 6a and 6b show the electronics bays containing the synchronization electronics, satellite-to-satellite communication radios, ground-to-satellite communication radios, the Phase Locked Loop type additional synchronization circuitry, overheat detection and protection circuitry, batteries, DC power supplies and microwave RF amplifiers, laser aiming devices, and photographic lens for infrared detection and live photographic feedback through communication radios.

In addition, there are other embodiments of the invention in which the microwave transmitters can be scaled to size for the appropriate use.

For example, rifles and pistols using the microwave transmitters can be utilized as an antipersonnel weapon and to disable electrical and electronic systems such as an automobile, building or low flying aircraft flying. The output should be a few hundred thousand volts from a rifle or pistol, restricted only by the power delivery of the battery or portable DC power supply.

In another example, tanks can be modified to include the microwave transmitters to fire wavestreams from the gun barrel instead of a projectile. Also, helicopters firing wavestreams provide the ability to instantaneously disable all electrical and electronic systems and blow apart the enemy's helicopter cockpit.

Also, space satellites can include the microwave transmitters so that two satellites can form a stereo pair which are synchronized in tandem. Alternatively, one satellite could be built to house a pair of waveguides and magnetrons, or gyrotrons, or other radar or microwave or high frequency outputting or emitting devices.

Furthermore, fighter airplanes can be outfitted with a pair of waveguides and microwave transmitters so that each wing would house a small gun barrel attached through a housing containing a magnetron, one magnetron in each wing which synchronize through existing onboard computers and existing aiming equipment.

In addition, the invention can be used with tanks in which small barrels attached to the underside of the existing large gun barrel to fire microwaves. Each tank links up to one or more tanks through radio communication equipment, which once connected to each other, will automatically lock on target and synchronize to each other to fire synchronized wavestreams upon the target object or in free air to resist troop advancement.

The invention can also be used with naval warships in which existing on-deck signature radar devices can be modified to construct rigid "swing into place" lockable point-source gun barrel type waveguides, which when needed, will swing in front of the existing signature radar emitting devices.

Alternatively, any two or more radar emitters or transmitters or other microwave or radar or high frequency emitting devices on the same or other naval warships are able to communicate and synchronize themselves through point-sourced (round, small rifle barrel like tubes) waveguides on target or in free-air.

According to the invention described above, there is provided an EMP weapon that projects electromagnetic waves from different origins that converge at a single point.

What is claimed is:

1. An apparatus comprising:
   a plurality of sub-atmospheric vehicular devices;
   a substantially high power microwave transmitter located on each of the vehicular devices, each of the high power microwave transmitters configured to operate in synchronized frequency, amplitude, and phase with each other;
   a waveguide for directing microwave energy from the high power microwave transmitter to a point in free space; and
   wherein microwave energy is directed from each of the plurality of vehicular devices to the point in free space.

2. The apparatus of claim 1 wherein each microwave transmitter is synchronized by communicating with one another.

3. The apparatus of claim 2 wherein each microwave transmitter is synchronized using an external synchronization station.

4. The apparatus of claim 1 wherein the output is aimable and confined toward the point in free space where it will collide.

5. The apparatus of claim 1 wherein the vehicular devices include at least one from the group of a tank, naval ship or aircraft, ground/planet based vehicle, or other platform or device attached to or set upon the ground to facilitate aiming and firing of the system.

6. The apparatus of claim 1 wherein each of the high power microwave transmitters are operated in phase for creating standing wave resonance at the point in free space.

7. The apparatus of claim 1 wherein the high power microwave transmitters are operated at the same frequency and amplitude for creating standing wave resonance at the point in free space.

8. An apparatus comprising:
   a sub-atmospheric vehicular device;
   at least a pair of substantially high power microwave transmitters located on the vehicular device, each of the high power microwave transmitters configured to operate in synchronized frequency, amplitude, and phase with each other;
   a waveguide being associated with each microwave transmitter for directing microwave energy from the high power microwave transmitter to a point in free space; and
   wherein microwave energy is directed from the vehicular device to the point in free space.

9. The apparatus of claim 8 wherein each microwave transmitter is synchronized by communicating with one another.

10. The apparatus of claim 9 wherein each microwave transmitter is synchronized using an external synchronization station.

11. The apparatus of claim 8 wherein the output is aimable and confined toward the point in free space where it will collide.

12. The apparatus of claim 8 wherein the vehicular device is chosen from the group consisting of a tank, a naval ship, and an aircraft.

13. The apparatus of claim 8 wherein each of the high power microwave transmitters are operated in phase for creating standing wave resonance at the point in free space.

14. The apparatus of claim 8 wherein the high power microwave transmitters are operated at the same frequency and amplitude for creating standing wave resonance at the point in free space.

\* \* \* \* \*